(12) United States Patent
Kwan et al.

(10) Patent No.: US 8,130,648 B2
(45) Date of Patent: Mar. 6, 2012

(54) HIERARCHICAL QUEUE SHAPING

(75) Inventors: Bruce H. Kwan, Sunnyvale, CA (US);
Puneet Agarwal, Cupertino, CA (US);
Asad Khamisy, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1197 days.

(21) Appl. No.: 11/642,554

(22) Filed: Dec. 21, 2006

(65) Prior Publication Data

US 2007/0153697 A1   Jul. 5, 2007

Related U.S. Application Data

(60) Provisional application No. 60/755,854, filed on Jan. 4, 2006.

(51) Int. Cl.
*H04J 1/16* (2006.01)
(52) U.S. Cl. ....................................................... 370/235
(58) Field of Classification Search ................. 370/235, 370/235.1, 236
See application file for complete search history.

(56) References Cited

U.S. PATENT DOCUMENTS

| | | | | | |
|---|---|---|---|---|---|
| 6,542,467 | B2 * | 4/2003 | Umayabashi | ................. | 370/236 |
| 6,654,343 | B1 * | 11/2003 | Brandis et al. | ................. | 370/229 |
| 6,687,781 | B2 * | 2/2004 | Wynne et al. | ................. | 710/317 |
| 7,023,799 | B2 * | 4/2006 | Takase et al. | ................. | 370/230.1 |
| 7,266,122 | B1 * | 9/2007 | Hogg et al. | ............. | 370/395.41 |
| 7,436,844 | B2 * | 10/2008 | Wang et al. | ................. | 370/412 |
| 7,474,615 | B2 * | 1/2009 | Pirzada et al. | ................. | 370/230 |
| 7,474,650 | B2 * | 1/2009 | O'Neill | ........................ | 370/349 |
| 2005/0083920 | A1 * | 4/2005 | Barri et al. | ..................... | 370/360 |
| 2006/0101178 | A1 * | 5/2006 | Zhong et al. | .................. | 710/112 |
| 2006/0187945 | A1 * | 8/2006 | Andersen | ..................... | 370/412 |

* cited by examiner

*Primary Examiner* — Derrick Ferris
*Assistant Examiner* — Mohammad Anwar

(57) ABSTRACT

A network device and method include token buckets, each token bucket associated with one of clients and virtual ports and configured to process information based on a predefined bandwidth and a strict priority/weighted deficit round robin. A maximum rate shaper module and a minimum rate meter module shape and meter whether any of the clients or virtual ports have exceeded a predefined threshold. A scheduler is configured to schedule services of the clients and to calculate a new bandwidth allocation for at least one of the clients or virtual ports when the at least one of the clients or virtual ports has exceeded the predefined threshold, the new bandwidth allocation replacing the predefined bandwidth and being proportional to the predefined bandwidth for each of the clients or virtual ports.

25 Claims, 7 Drawing Sheets

HIERARCHICAL QUEUE SHAPING

CROSS-REFERENCE TO RELATED APPLICATIONS

This application claims priority of U.S. Provisional Patent Application No. 60/755,854, filed on Jan. 4, 2006. The subject matter of this earlier filed application is hereby incorporated by reference.

BACKGROUND OF THE INVENTION

1. Field of the Invention

The present invention relates to a network device in a data network and, more particularly, to shaping and metering traffic through a network device at a client and virtual port levels.

2. Description of the Related Art

A packet switched network may include one or more network devices, such as an Ethernet switching chip, each of which includes several modules that are used to process information that is transmitted through the device. Specifically, the device includes a router, a Memory Management Unit (MMU), and an egress module. The router includes switching functionality for determining to which destination port a packet should be directed. The MMU is used for storing packet information and for performing resource checks. An ingress module processes incoming packets.

The egress module is used for performing packet modification and for transmitting the packet to at least one appropriate destination port. One of the ports on the device may be a CPU port that enables the device to send and receive information to and from external switching/routing control entities or CPUs.

Accordingly, network devices often have to monitor the flow of traffic through the network device to determine whether there are points of congestion. The traffic through the device may have specific priorities, such as class-of-service (COS) or Quality-of-Service (QoS), and the monitoring of traffic may be useful in making sure that those priorities are preserved. In addition to monitoring, the traffic through the network device can also be shaped to meet specific requirements. The shaping allows for the network device to accommodate minimum, maximum, and bursty requirements.

A router's switch fabric can deliver packets from multiple ingress ports to one of a number of egress ports. The linecard connected to this egress port must then transmit these packets over some communication medium to the next router in the network. The rate of transmission is normally limited to a standard rate. Accordingly, a queue per COS has been provided so that traffic routed through higher priority queues can bypass that in lower priority queues. Certain queues may also be assured a guaranteed portion of the available output line bandwidth. On first sight, the traffic handling task appears to be straightforward. Packets are placed in queues according to their required class of service. Scheduling, in turn, controls the de-queuing process by dividing the available output line bandwidth between the queues. In a conventional approach to traffic scheduling, one might typically place packets directly into an appropriate queue on arrival, and then subsequently dequeue packets from those queues into an output stream. However, the packet arrival rate can be very high due to overspeed in the packet delivery from the switch fabric, which demands high data read and write bandwidth into memory. Thus, the processing overhead of some scheduling is high. Also, in conventional routers, often times there are no sufficient queuing structures to the egress module.

Thus, a router is needed that would be highly configurable to provide a sufficient scheduling structure to support various COS. A scheduler that is needed is one that may be able to provide more fine grained queuing and scheduling of data to a port, which may include virtual ports, each including multiple COS.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

It is to be understood that in one embodiment of the present invention, the operations are performed in the sequence and manner as shown. However, the order of some operations and the like may be changed without departing from the spirit and scope of the present invention.

Figure 1:
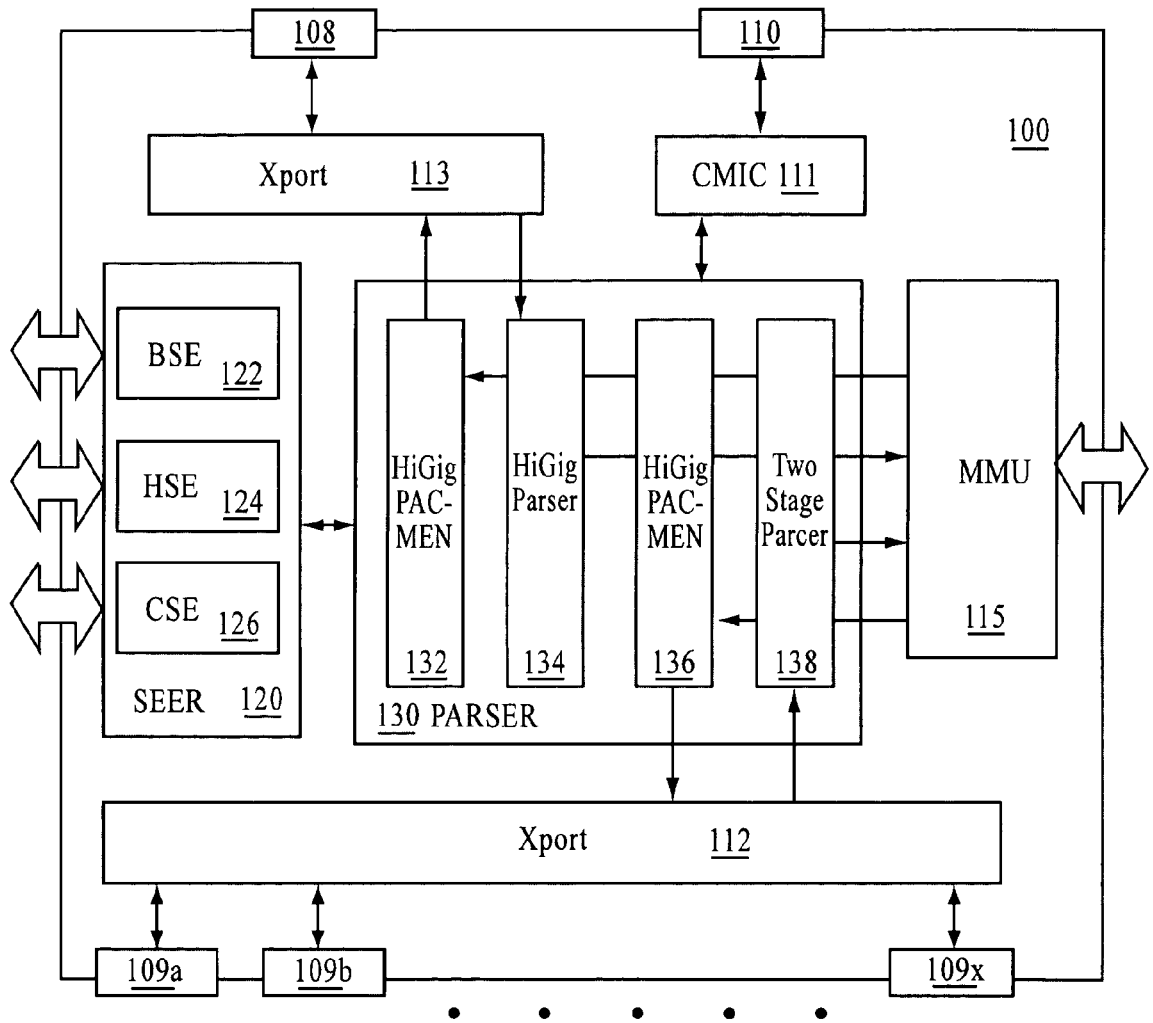
FIG. 1 illustrates a network device in which an embodiment of the present invention may be implemented.

FIG. 1 illustrates a network device, such as a switching chip, in which an embodiment the present invention may be implemented. The network device 100 includes port interface modules 112 and 113, a MMU 115, an ingress and egress module (parser) 130 and a search engine 120. The ingress and egress module (parser) 130 parses the data received and performs look ups based on the parsed data using the search engine 120. The primary function of MMU 115 is to efficiently manage cell buffering and packet pointer resources in a predictable manner, even under severe congestion scenarios. Through these modules, packet modification can occur and the packet can be transmitted to an appropriate destination port.

According to several embodiments, the network device 100 may also include one internal fabric high speed port, for example a HiGig™ port, 108, one or more external Ethernet ports 109a-109x, and a CPU port 110. High speed port 108 is used to interconnect various network devices in a system and thus form an internal switching fabric for transporting packets between external source ports and one or more external destination ports. As such, high speed port 108 may not externally visible outside of a system that includes the multiple interconnected network devices. CPU port 110 is used to send and receive information to and from external switching/routing control entities or CPUs. According to an embodiment of the invention, CPU port 110 may be considered as one of external Ethernet ports 109a-109x. The network device 100 interfaces with external/off-chip CPUs through a CPU processing module 111, such as a CMIC, which interfaces with a PCI bus that connects the network device 100 to an external CPU.

In addition, the search engine module 120 may be composed of additional search engine modules, 122, 124 and 126, that are used to perform particular look ups that are used in the characterization and modification of data being processed by the network device 100. Likewise, the ingress and egress module 130 also includes additional modules that are directed to parsing data received from the internal fabric high speed port 134 and the other ports 138, with other modules 132 and 136 for forwarding data back to the ports of the network device. The two parsers are discussed in greater detail below.

Network traffic enters and exits the network device 100 through external Ethernet ports 109a-109x. Specifically, traffic in the network device 100 is routed from an external Ethernet source port to one or more unique destination Ethernet ports. In one embodiment of the invention, the network device 100 supports twelve physical Ethernet ports 109, each of which can operate in 10/100/1000 Mbps speed and one high speed port 108 which operates in either 10 Gbps or 12 Gbps speed.

Figure 2:
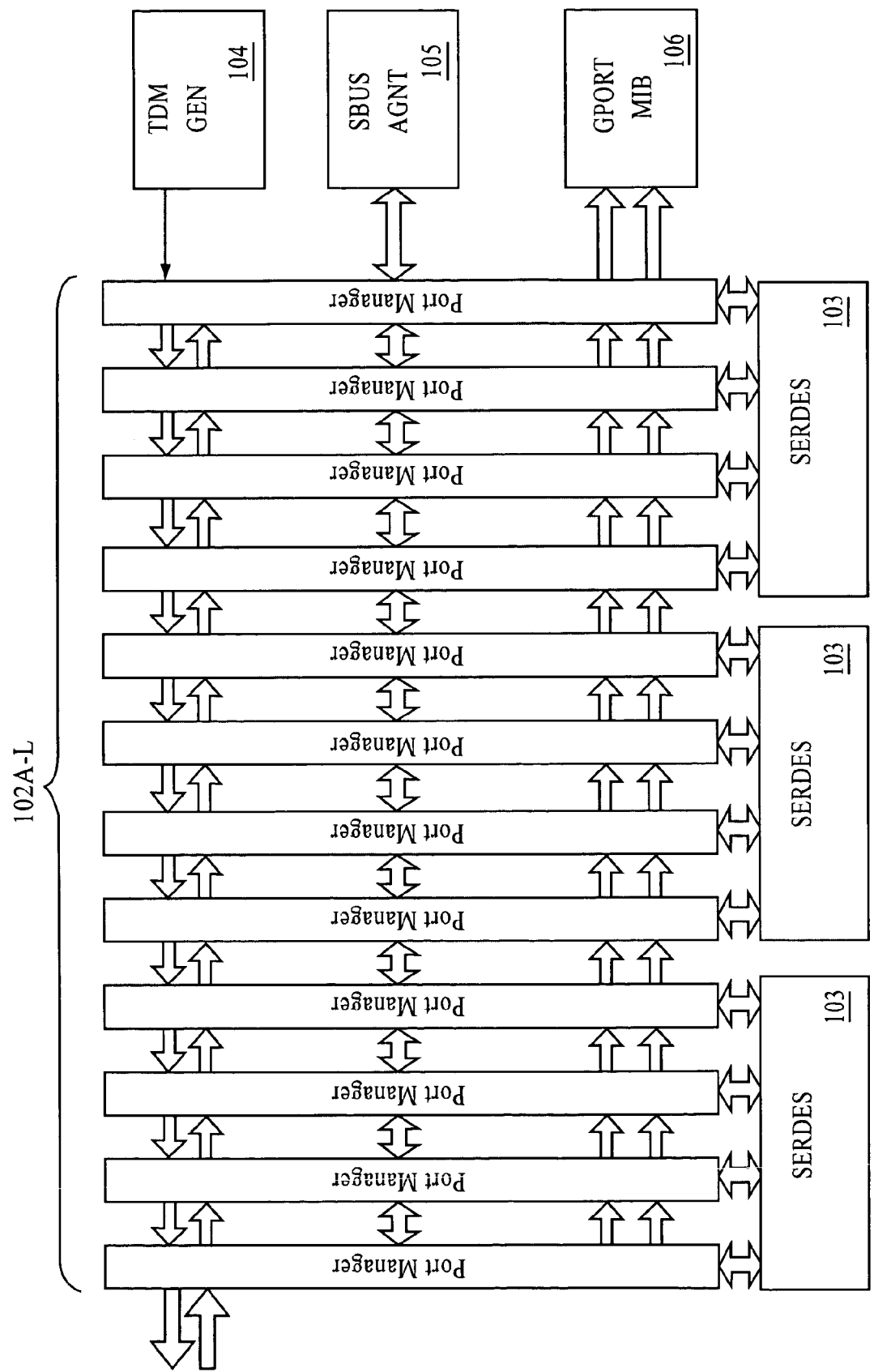
FIG. 2 illustrates a block diagram illustrating the communication using ports of the network device, according to an embodiment of the instant invention.

The structure of the physical ports 112 are further illustrated in FIG. 2. A series of serializing/deserializing modules 103 send and receive data, where data received at each port is managed by a port manager 102A-L. The series of port managers have a timing generator 104 and a bus agent 105 that facilitate their operation. The data is received and transmitted to a port information base so that the flow can be monitored. It is noted that high speed port 108 has similar functionalities but does not require as many elements since only one port is being managed but operating at a higher speed.

Figure 3A:
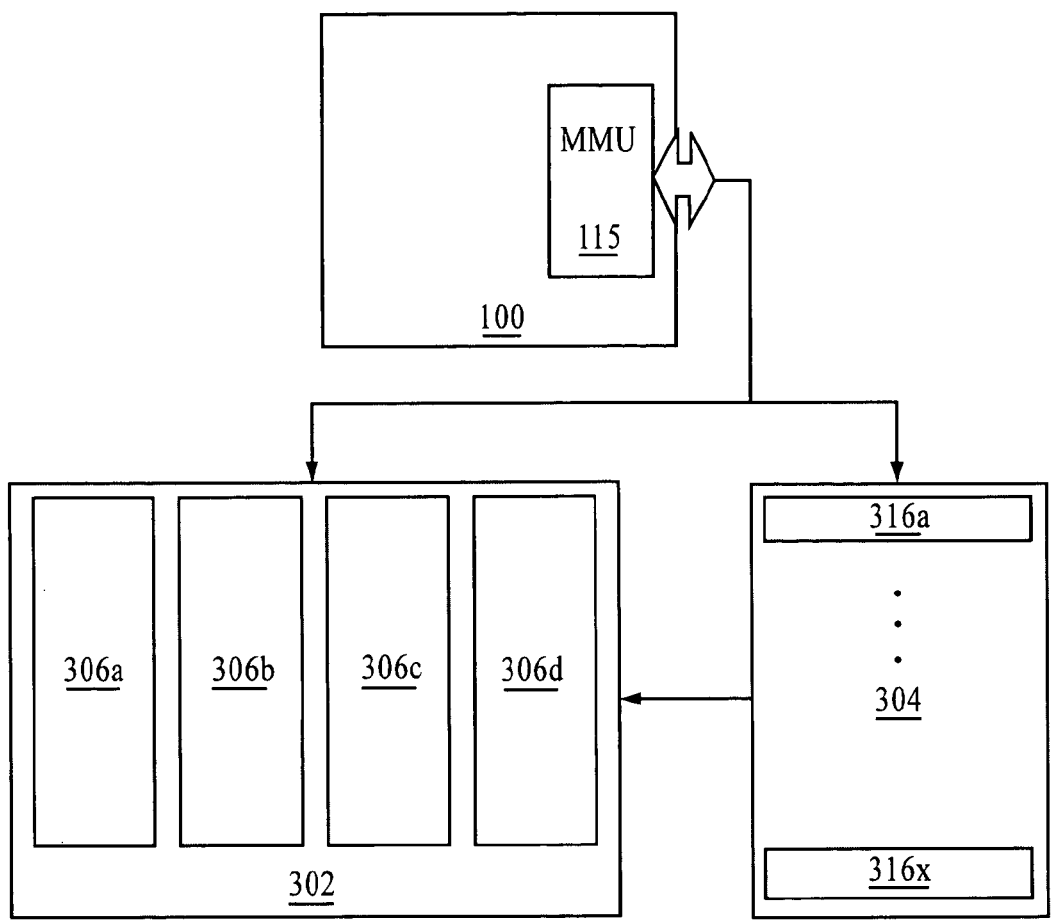
FIGS. 3a and 3b illustrate memory structures to be used with the network device, with FIG. 3a illustrating the shared memory that is external to the network device and FIG. 3b illustrating the Cell Buffer Pool of the shared memory architecture.
Figure 3B:
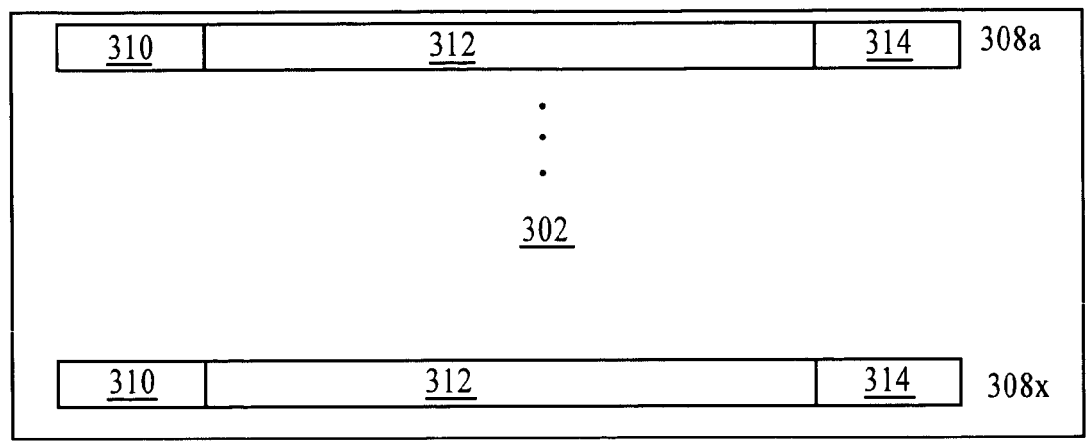

In an embodiment of the invention, the network device 100 is built around a shared memory architecture, as shown in FIGS. 3a-3b where MMU 115 enables sharing of a packet buffer among different ports while providing for resource guarantees for every ingress port, egress port, and class of service queue associated with each egress port. FIG. 3a illustrates the shared memory architecture of the present invention. Specifically, the memory resources of the network device 100 include a Cell Buffer Pool (CBP) memory 302 and a Transaction Queue (XQ) memory 304. CBP memory 302 is an off-chip resource that is made of, according to some embodiments, 4 DRAM chips 306a-306d. According to an embodiment of the invention, each DRAM chip has a capacity of 288 Mbits, where the total capacity of CBP memory 302 is 122 Mbytes of raw storage. As shown in FIG. 3b, CBP memory 302 is divided into 256K 576-byte cells 308a-308x, each of which includes a 32 byte header buffer 310, up to 512 bytes for packet data 312 and 32 bytes of reserved space 314. As such, each incoming packet consumes at least one full 576 byte cell 308. Therefore, in an example where an incoming includes a 64 byte frame, the incoming packet will have 576 bytes reserved for it even though only 64 bytes of the 576 bytes is used by the frame.

Returning to FIG. 3a, XQ memory 304 includes a list of packet pointers 316a-316x into CBP memory 302, where different XQ pointers 316 may be associated with each port. A cell count of CBP memory 302 and a packet count of XQ memory 304 are tracked on an ingress port, egress port, and class of service basis. As such, the network device 100 can provide resource guarantees on a cell and/or packet basis.

Once a packet enters the network device 100 on a source port 109, the packet is transmitted to parser 130 for processing. During processing, packets on each of the ingress and egress ports share system resources 302 and 304. In specific embodiments, two separate 64 byte bursts of packets may be forwarded to the MMU 115 from the local ports and the high speed port.

After a process of parsing and evaluating of data received, a forwarding decision is made with regard to the received information. The forwarding decision is generally made as to what destination port the packet data should be sent to, although the decision can be made to drop a packet or forward a packet to a CPU or other controller through the CMIC 111. On egress, the packet is modified based on the parsing and evaluation of the network device. Such modification can include tagging, modification of header information or addition of a module header, if the egress port is the high speed port. The modification is performed on a cell basis to avoid delays in the forwarding of the packet data.

In an embodiment using end to end flow control messaging, the egress module may detect when a port/COS group state counter exceeds an XOFF threshold. The egress module would then broadcast an end to end flow control XOFF message to all source modules. The ingress module receives the end to end flow control XOFF message and stops servicing data packets corresponding to a relevant Virtual Output Queue (VOQ).

In an XON generation, the egress module detects the port/COS group state counter dropping below the XON threshold. The egress module would then broadcast an end to end flow control XON message to all source modules. The ingress module would then receive the end to end control XON message and resume servicing the relevant VOQ.

Figure 4:
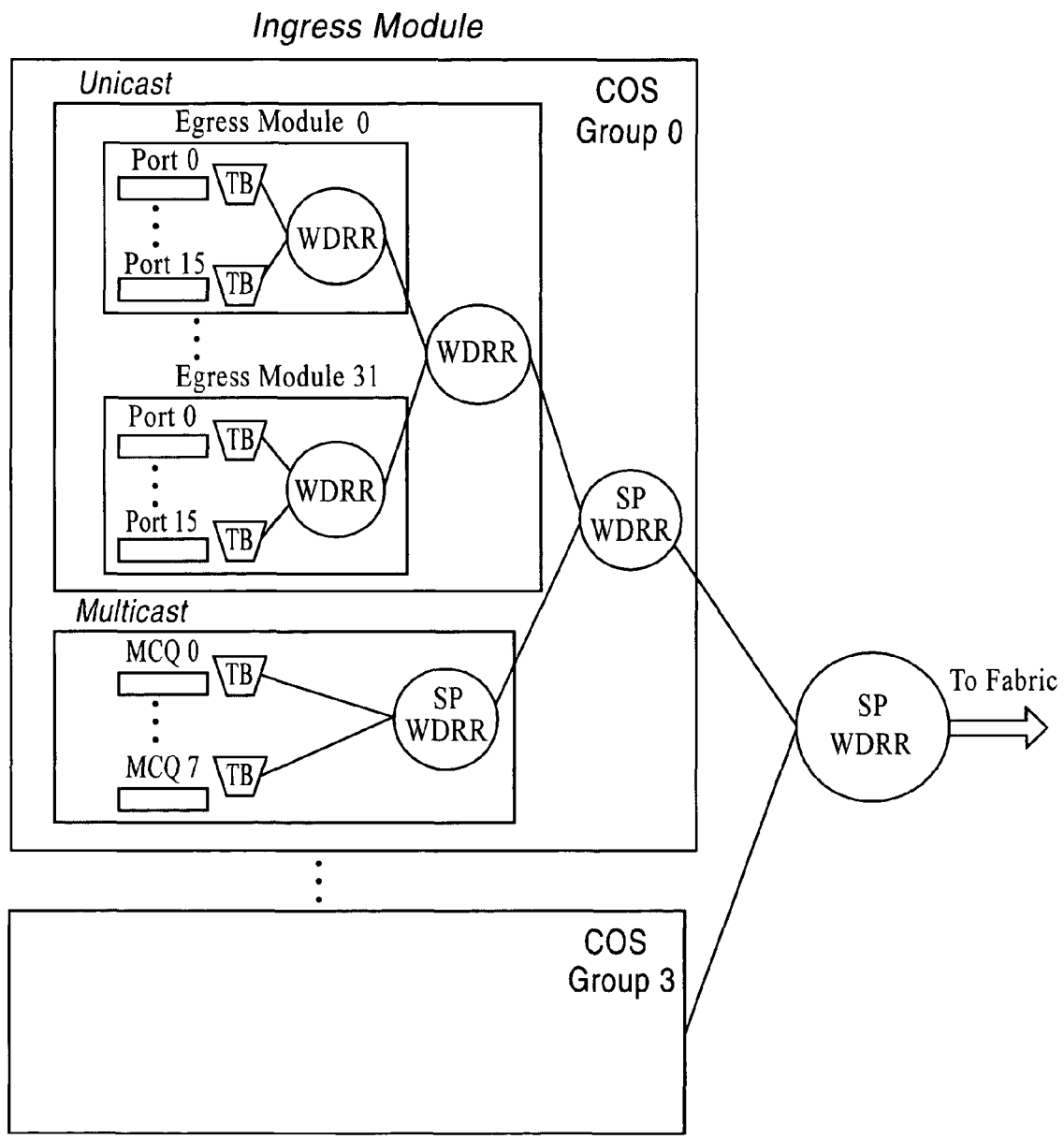
FIG. 4 illustrates an ingress module VOQ structure, in accordance with an embodiment of the present invention

FIG. 4 illustrates an ingress module VOQ structure, in accordance with an embodiment of the present invention. Specifically, FIG. 4 illustrates a hierarchical scheduler that may be included at an edge of the system. An end to end flow control state message is transmitted from the egress module to the ingress module when congestion is detected at the egress module. This end to end flow control state message is used to cause the ingress module to modulate service of the specific queue in its hierarchical structure that is directing traffic to the congested egress module. The ingress module may implement a flow control state timeout mechanism which may be used to guard against starvation. The timeout value may be application or user configurable. In addition, end to end flow control state may be also periodically transmitted from the egress module to the ingress module to refresh the flow control state for that egress module. This periodic transmission of the end to end flow control state may be used to insure against flow control state messages that may be lost and/or to refresh the flow control state for the appropriate queues found in the ingress modules. Multicast and unicast traffic may be accounted for separately at the egress module and multicast VOQs may not be flow controlled. Unicast queues may be a function of COS group, module, and port/virtual port. For instance, the ingress module may include 4 COS groups, 32 modules, and 16 ports or virtual ports/module. In the alternative, the ingress module may include 2 COS groups, 64 modules, and 16 ports or virtual ports/module. To support more than 16 ports/virtual ports, the ingress module may be viewed as multiple modules. The ingress module may also include a predetermined number of configurable multicast queues, for instance, 32 configurable multicast queues, and may handle VPN broadcast traffic and/or L2 broadcast traffic.

Traffic shaping is a mechanism that alters traffic characteristics of a stream to achieve better network efficiency while meeting the Quality of Service (QoS) objectives or to ensure conformance at a subsequent interface. Traffic shaping should also allow for buffer latency to be insensitive to traffic to allow latency sensitive traffic to get though first. Traffic metering is a measurement mechanism that supports the differentiated services (DiffServ) traffic conditioning functionality (i.e., marks/polices packets). This aids in differentiated treatment of packets based on whether or not they are a part of a flow that is in or out of profile according to the pre-defined QoS objectives (i.e., Service Level Agreements (SLAs)).

Both traffic metering and shaping occur through multiple portions of the network device 100, according to embodiments of the present invention. Some of the metering and shaping occurs through the filter processor and other portions occur through the MMU. The metering and shaping that occurs through the MMU works with traffic from the higher speed port and the 1 Gigabit Ethernet ports. The metering and shaping process in the filter processor utilizes a refresh count based on a token bucket, to be later described, and the refresh count for the MMU is based on a token bucket. In both, according to certain embodiments, the update interval is between 1-10 μs, with bucket depths dependent on traffic bursting range and accommodates bursts of up to a specific rate that depends on the traffic that could be allowed.

With respect to scheduling, many types of scheduling may be supported including strict priority, round robin, weighted deficit round robin (WDRR), strict priority+weighted deficit round robin for excess bandwidth allocation, and strict priority+round robin for minimum bandwidth allocation. Through a combination of min/max metering and shaping and the general scheduler configuration, a wide variety of scheduling behavior may be configured. Per port maximum bandwidth rate limiting is also provided to limit the port rate.

Figure 5:
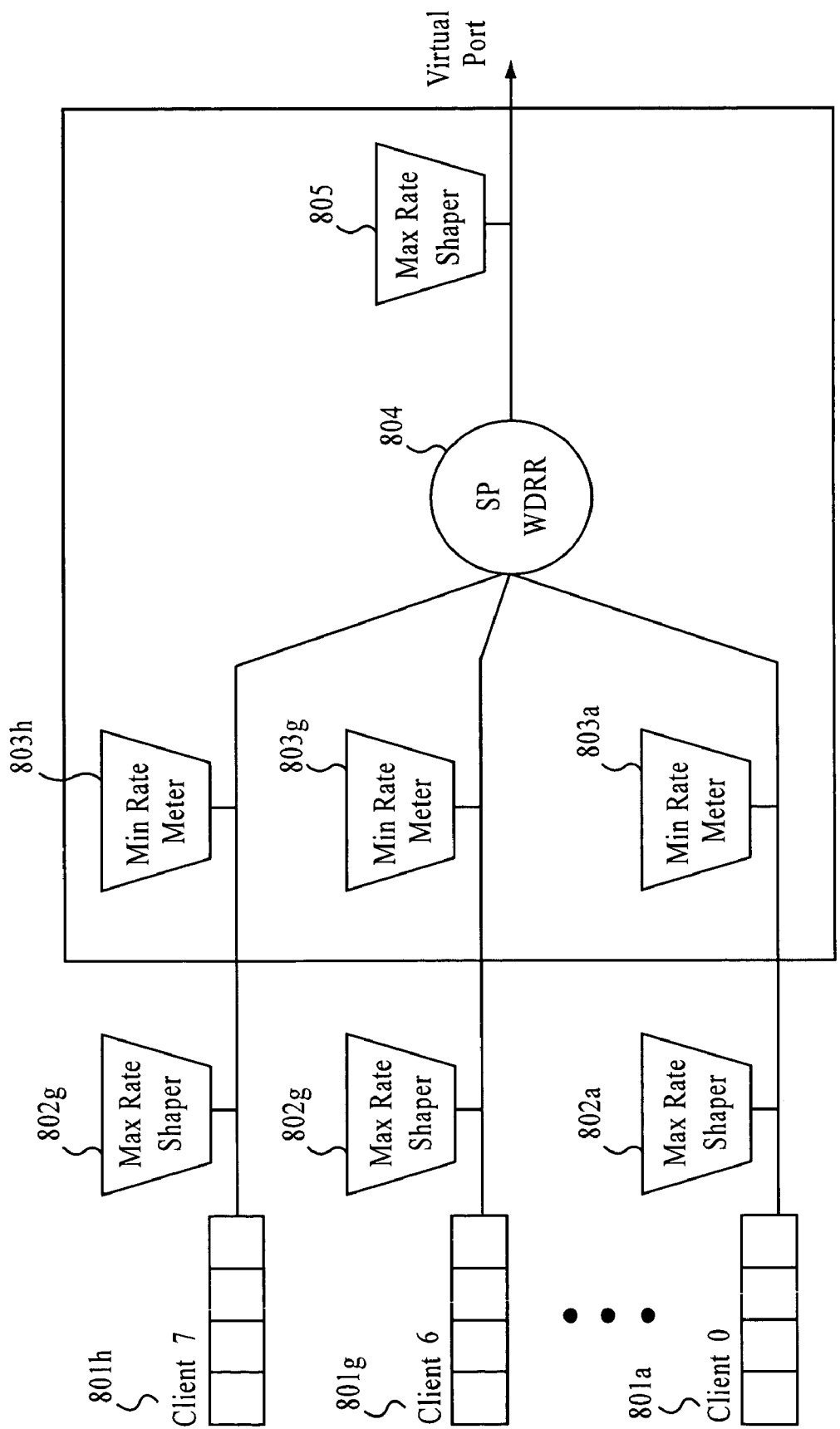
FIG. 5 illustrates a process of metering, shaping and scheduling of traffic in a network device, according to one embodiment of the present invention.

The scheduling order that may be applied uses several variables which are affected by the bandwidth used by a specific queue. In accordance with an embodiment of the present invention, associated with each client queue and virtual port queue are a minimum bandwidth requirement and a maximum bandwidth limit. Based on these specifications and the associated traffic meters per client queue, the state variables are updated. The Boolean state variables include the following: MinSatisfied, MaxExceeded. Based on these variables, the set of client queues may be divided into three possible groups: MinBWGroup, ExcessBWGroup, and IdleGroup. The MinBWGroup is populated by client queues that have MinSatisfied set to false. The ExcessBWGroup is populated by client queues that have MinSatisfied set to true and MaxExceeded set to false. The IdleGroup is populated by client queues that have both MinSatistied and MaxExceeded set to true. When all client queues are in the IdleGroup, no queues are serviced. This scheduling is illustrated in FIG. 5. The queues are separated by clients, 801a through 801h, in the illustrated embodiment. Each client queue has a maximum rate shaper module, 802a through 802h, and a minimum rate meter module, 803a through 803h, that set a shaping and metering behavior, respectively, to be discussed below. Each module feeds into a scheduler 804. The output of the scheduler 804 also passes through a maximum rate shaper module 805 to monitor and shape the maximum traffic flow for all of the queues. Thereafter, the scheduled traffic is sent to the virtual port.

With respect to a weighted deficit round robin (WDRR) scheduling performed at the scheduler 804, relative bandwidth sharing is provided across all active client queues. WDRR weights are set relative to each other and the weights range from 0 to 127. The weights can vary between predefined whole number values, with a basic quantum based on the MTU size. Quantum is a number of credits received at the beginning of every round and is a function of the weight. At the beginning of the WDRR round, quantum is added into credit counters. The scheduler 804 services all queues with positive credits until either the credits are depleted or the queue goes empty. At the end of the WDRR round, the clients with the empty queues that have a positive counter is reset to zero. If minimum bandwidth is configured, this requirement will be met first. Ordering of how minimum bandwidth is distributed is influenced by WDRR scheduler. Excess bandwidth is shared according to the WDRR weights. This feature may also be disabled, according to some embodiments of the invention.

With respect to min/max bandwidth sharing, such scheduling provides a minimum bandwidth and a maximum bandwidth per client, where the minimum and maximum bandwidth settings are absolute. The duty of the scheduler 804 is to assure that each client, 801a through 801h, and virtual port has a minimum bandwidth allocated. Once the minimum bandwidth is satisfied, then the excess bandwidth is to be distributed. The excess bandwidth is distributed based on various criteria, such as priority, weighted deficit round robin, etc.

The scheduler 804 classifies every client to be queued into a minimum group (when the minimum bandwidth has been satisfied), a maximum group (when the maximum bandwidth has been satisfied), and an excess group or idle group. If a client is in the minimum group, the scheduler 804 will continue servicing that client until the minimum bandwidth for that client is satisfied based on the criteria given (e.g., round robin). Thus, for instance, if a client or virtual port is to be assigned a high priority, in one example, a high minimum bandwidth may be provided for such client or virtual port to assure that the scheduler services such client at the higher priority. The scheduler 804 will continue servicing those clients that are in the minimum group prior to servicing those clients over the minimum bandwidth.

With respect to scheduling using a strict priority with WDRR, when using the DRR scheduler, if a set of queues are configured with a zero weight, those queues are serviced according to a strict priority. For example, client7 may receive up to 80% of the bandwidth (on a 1 Gbps link) before other queues are allowed access to the remaining bandwidth. The remaining bandwidth is distributed only when client7 is empty (in this case when MinBW=0), in this example. Bandwidth not used by client7 is distributed according to the relative WDRR weights.

Similarly, with scheduling using strict priority with min/max bandwidth sharing, a minimum bandwidth and a maximum bandwidth per client are provided. Again, minimum and maximum bandwidth settings are absolute and a strict priority is used to service both the MinBWGroup and ExcessBWGroup groups.

Traffic monitoring is desirable to allow monitoring and control over the data traffic being released into the network for different client/virtual port levels. This control is used for delivering data packets corresponding to particular clients/virtual ports to be received, processed, and delivered within certain limits. In the present system, traffic policing at the ingress modules of the network device 100 is implemented using token buckets, which regulate the sustained flow rate of traffic into the network around at least one threshold value while allowing some local variability in the traffic inflow around its long-term average. In an embodiment and as illustrated in FIG. 5, the monitoring and control of traffic may be performed on a "per port" basis, on a "per virtual port" basis, on a "per client" basis, or on a "per COS" basis. That is, a token bucket (TB) may be provided to be associated with each port, virtual port, client, COS, or multicast configurable queue (MCQ) set up at each ingress module, where each token bucket would monitor and regulate the flow of traffic associated with that service instance.

Figure 6:
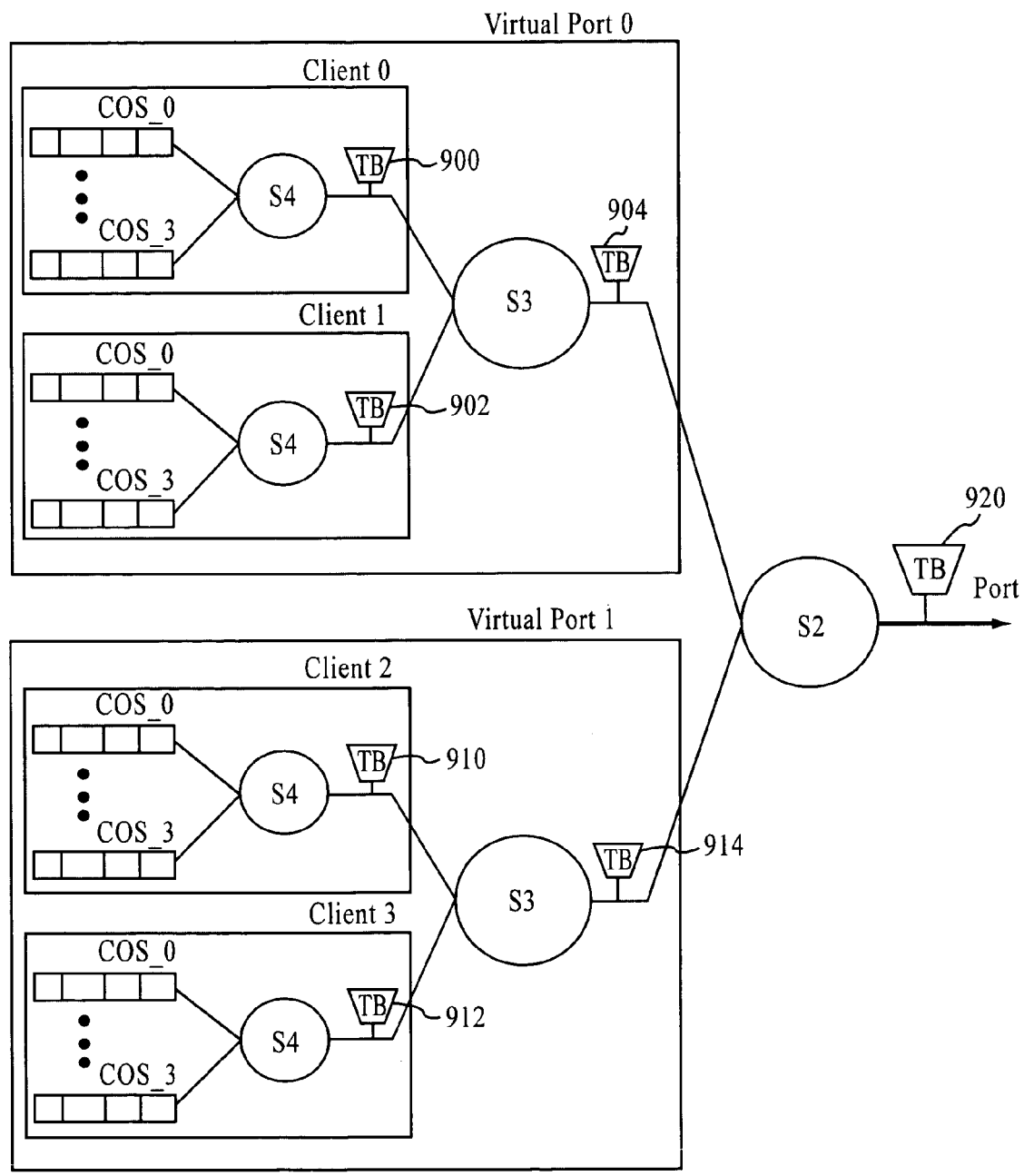
FIG. 6 illustrates a configuration at a client and virtual port granularity, in accordance with an embodiment of the present invention.

FIG. 6 illustrates a configuration at a client and virtual port granularity, in accordance with an embodiment of the present invention. In an embodiment, 128 virtual ports may be assignable across multiple ports and 4 k of clients may be assignable across a set of virtual ports. However, for illustrative purposes, two virtual ports are illustrated (Virtual Port 0 and Virtual Port 1) including at least two clients, client 0 and client 1 for Virtual Port 0, and client 2 and client 3 for Virtual Port 1. Each client may support up to a configurable number of four COS groups (COS_0 ... COS_3). A scheduling configuration (S4) of the token bucket, 900, 902, 910, and 912, of a COS Group including COS_0 to COS_3 for each client is based on a strict priority/weighted deficit round robin. The scheduling configuration (S3) of a token bucket, 904 and 914, of a client including client 0 and client 1 is based on a minimum/maximum bandwidth plus the strict priority/WDRR. In addition, the scheduling configuration (S2) of a token bucket, 920, of a Virtual Ports including Virtual Port 0 and Virtual Port 1 for each client is based on a minimum/maximum bandwidth plus a strict priority/WDRR. Another scheduling configuration (S1), not shown, may be provided per port.

The token bucket is characterized by predetermined parameters: token size, a minimum threshold, and a maximum threshold. The token size defines an average sustainable traffic rate and the maximum threshold as the largest traffic burst that the token bucket allows into the network. Each scheduler, S2. S3, and S4, would maintain a clock, which may be used for updating the state of the token buckets for all service instances, each scheduler, S2, S3, and S4, also maintains a state variable, X, for each token bucket. At the end of each clock period of duration T ms, the scheduler updates the state variable, X.

Because the clock period T is fixed, a token size parameter (token size) of the token bucket determines the rate at which the corresponding service instance can transmit data on a sustained basis. Specifically, if token size is measured in bits and the clock period, T, is measured in milliseconds, then the maximum sustainable data rate for the corresponding service class is given by token size/T kbps.

Packet handling and token bucket updates are done independently, in an asynchronous manner. Whenever a packet is received, the packet is processed by the network device 100 and is passed through the packet classifier to identify its service. Each token bucket may also include a time scale which, once a client is determined to have reached the minimum bandwidth and is outside the minimum group for a predetermined period of time, the timer will count the time the client has been outside such group. During this time, the minimum bandwidth originally met for the client will decrease as the data is transmitted. Once the time scale reaches the predetermined period of time, the client will fall back into the minimum group as the minimum bandwidth has dropped during the predetermined period of time, thus, preventing starvation. In another configuration, if multiple clients are in the minimum group, the scheduler may service these clients based on a predefined priority level or weighted deficit round robin. Once the client is outside the minimum group, it may also include another priority level to be serviced according to a maximum group and an excess group.

The maximum rate shaping occurs per virtual port basis and the maximum rate shaping and the minimum rate metering occurs on both a client queue and a per virtual port basis.

The minimum and maximum rate state variables are used by the scheduler. With respect to the minimum rate metering, rates of 64 kbps to 16 Gbps may be supported, in predefined increments. The process 1001-$a$ employs a minimum bandwidth (MinBW) token bucket as illustrated in FIG. 7$a$, with the bucket 1010-$a$.

The minimum threshold, MIN_THRESHOLD, of the token bucket is user configurable and defines a level in which a bucket count should be before it is declared that the minimum allowable threshold has been satisfied for a particular client or virtual port. The scheduler associated with the token bucket flags when the minimum threshold is satisfied. As long as the client or virtual port is transmitting at a rate above the minimum bandwidth, a bucket count will rise. It is user configurable to define the duration that the bucket needs to exceed this rate before declaring that the minimum threshold is satisfied.

The BUCKET_COUNT_MIN is indicated by 1014-$a$. The minimum rate flag 1020-$a$ outputs a zero, when the BUCKET_COUNT_MIN<MIN_THRESHOLD and outputs a one, when BUCKET_COUNT_MIN>=MIN_THRESHOLD. MIN_REFRESH_COUNT tokens are removed from the token bucket every T_REFRESH time units 1005-$a$. When packets are sent 1007-$a$ and when the scheduler is servicing MinBW, an appropriate number of tokens are added to the token bucket 1003-$a$. When the scheduler is servicing an excess bandwidth (ExcessBW) and packets are sent, no tokens are added to the token bucket. Through this process, the minimum rate metering occurs.

Figure 7B:
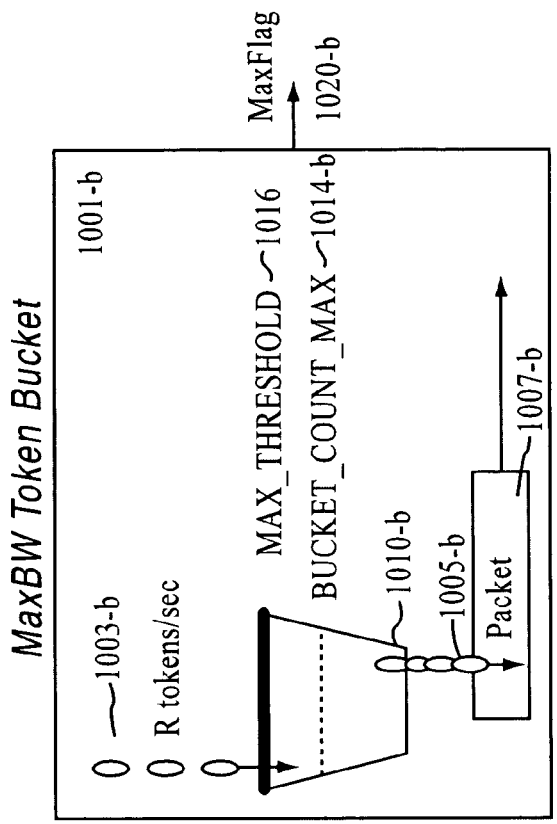
FIGS. 7a and 7b illustrate token bucket processes of metering, according to one embodiment of the present invention.
Figure 7A:
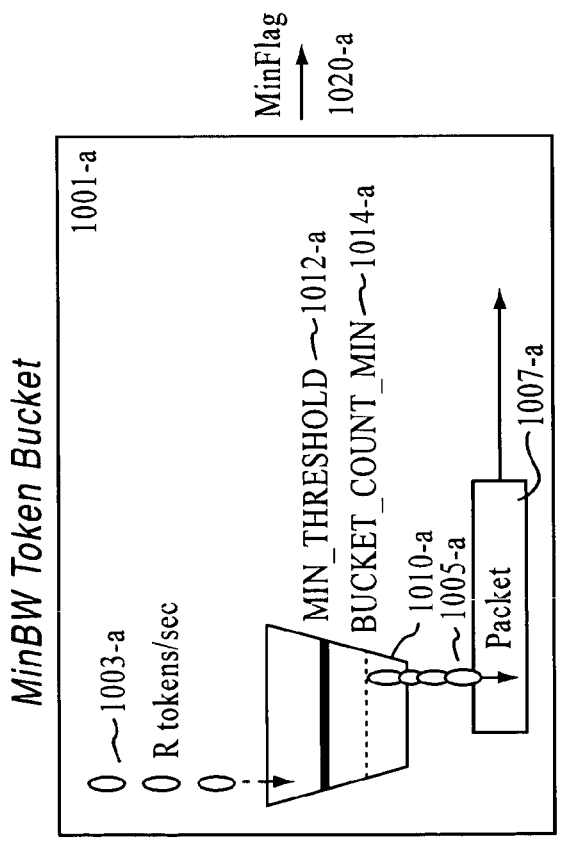

The process 1001-$b$ that employs a token bucket is illustrated in FIG. 7$b$, with the bucket 1010-$b$. With respect to the minimum rate metering, rates of 64 kbps to 16 Gbps may be supported, in 64 kbps increments. The maximum threshold 1016 for the MaxBW token bucket, i.e., MAX_THRESHOLD, is user dependent. The maximum threshold 1016-$b$ of the MinBW and the MaxBW token buckets may be defined as how long can data transmission be set at a maximum rate before data transmission is stopped. Across active queues, a relative bandwidth share for the data for each client or virtual port is allocated.

The maximum rate flag 1020-$b$ outputs a zero, when the BUCKET_COUNT_MAX<MAX_THRESHOLD and outputs a one, when BUCKET_COUNT_MAX>=MAX_THRESHOLD. MAX_REFRESH_COUNT 1005-$b$ tokens are removed from the token bucket 1010-$b$ every T_REFRESH time units. When packets are sent 1007-$b$, the appropriate number of tokens are added to the token bucket 1003-$b$. Through this process, the maximum rate metering occurs.

A person of ordinary skill in the art will appreciate that the processes described in FIGS. 7$a$ and 7$b$ may be applied to any of the token buckets previously described including those described and illustrated in FIG. 6.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the terms packet and datagram have been used in the description of the present invention, the invention has import to many types of network data. For purposes of this invention, the term packet includes packet, cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. A network device for scheduling packets, the network device comprising:
   one or more virtual ports implemented across multiple physical ports;
   one or more clients implemented across the one or more virtual ports, wherein each of the one or more clients supports a number of classes-of-service (COSs);
   one or more token buckets, each of the one or more token buckets being associated with one of the one or more clients and the one or more virtual ports;
   a maximum rate shaper module and a minimum rate meter module configured to shape and meter whether at least one of the one or more clients and the one or more virtual ports have exceeded a respective predefined threshold set for that client or virtual port; and
   a scheduler configured to schedule services of the clients and to calculate a new bandwidth allocation for each of the at least one of the one or more clients and the one or more virtual ports that have exceeded their respective predefined threshold, each new bandwidth allocation being proportional to a respective previous bandwidth allocation for each of the at least one of the one or more clients and the one or more virtual ports that have exceeded their respective predefined threshold, wherein the scheduler is further configured to classify each of the one or more clients such that respective data to be queued for each of the one or more clients is queued into a minimum group, when a minimum bandwidth is satisfied, a maximum group, when a maximum bandwidth is satisfied, and one of an excess group and an idle group.

2. The network device as recited in claim 1, wherein the one or more token buckets for each client of the one or more clients comprises:
   a minimum token bucket; and
   a maximum token bucket, wherein the one or more token buckets are configured to use strict priority and round robin for minimum bandwidth allocation and to use strict priority and weighted deficit round robin for excess bandwidth allocation.

3. The network device as recited in claim 1, wherein the one or more token buckets for each virtual port of the one or more virtual ports comprises:
   a minimum token bucket; and
   a maximum token bucket, wherein the one or more token buckets are configured to use strict priority and round robin for minimum bandwidth allocation and to use strict priority and weighted deficit round robin for excess bandwidth allocation.

4. The network device as recited in claim 1, wherein the scheduler continues servicing each of the one or more clients until a minimum bandwidth for each of the one or more clients is respectively satisfied.

5. The network device as recited in claim 1, further comprising:
   a first maximum rate shaper module and a minimum rate meter module, the first maximum rate shaper module and the minimum rate meter module being configured to set a shaping and metering behavior between each of the one or more clients and a scheduler to assure that each of the one or more clients has a minimum bandwidth allocated to it; and
   a second maximum rate shaper module coupled between the scheduler and the virtual port associated with the one or more clients.

6. The network device as recited in claim 1, wherein at least one of the one or more token buckets is configured to accept a number of tokens in proportion to a size of a packet being queued for an associated client of the one more clients.

7. The network device as recited in claim 1, wherein at least one of the one or more token buckets is configured to use its respective allocated bandwidth to determine how many tokens to release at predetermined time intervals.

8. The network device as recited in claim 1, wherein the scheduler is further configured to compare a fill rate of at least one of the clients or virtual ports with its respective predefined threshold to determine whether any of the clients or virtual ports have exceeded their respective predefined threshold.

9. The network device as recited in claim 1, wherein the scheduler is further configured to process data associated with at least one of the clients based on a relative weight field, wherein the relative weight field is used to determine, for each of the at least one of the clients, whether a respective allocated bandwidth is a relative bandwidth guarantee or an absolute bandwidth guarantee.

10. The network device as recited in claim 1, further comprising:
    an ingress module including a hierarchical scheduler configured to manage flow control of traffic across a fabric; and
    an egress module configured to transmit an end to end flow control state message to the ingress module when congestion is detected at the egress module, wherein the end to end flow control state message results in the ingress module modulating service of a specific queue in its hierarchical structure that is directing traffic to the egress module.

11. The network device as recited in claim 10, wherein the ingress module comprises a flow control state timeout mechanism configured to guard against starvation.

12. The network device as recited in claim 10, wherein the egress module is further configured to periodically transmit an end to end flow control state to the ingress module to refresh the flow control state for that egress module.

13. The network device as recited in claim 1, further comprising one or more unicast queues that are configured to operate as a function of class of service group, module, and port/virtual port.

14. A method for scheduling packets, the method comprising:
- assigning virtual ports across multiple physical ports;
- assigning clients across the virtual ports, wherein each client supports a number of classes-of-service (COSs);
- configuring token buckets to process information in the clients and the virtual ports based on respective predefined bandwidths and a strict priority/weighted deficit round robin;
- metering whether any of the clients or virtual ports have exceeded a respective predefined threshold;
- calculating a respective, new bandwidth allocation for each of the clients and virtual ports that have exceeded their respective predefined threshold, each respective, new bandwidth allocation replacing each respective corresponding predefined bandwidth and being proportional to the respective predefined bandwidth for each of the one or more clients and each of the one or more virtual ports that have exceeded their respective predefined threshold;
- configuring a first maximum rate shaper module and a minimum rate meter module so as to set a shaping and metering behavior between each client and a scheduler to assure that each client has a minimum bandwidth allocated; and
- configuring a second maximum rate shaper module so as to set a shaping between the scheduler and the virtual port associated with the clients.

15. The method as recited in claim 14, wherein configuring the token buckets for each client further comprises:
- configuring a minimum token bucket;
- configuring a maximum token bucket;
- configuring the token buckets to allocate bandwidth, in conjunction with a scheduler, in accordance with the strict priority and round robin for minimum bandwidth allocation; and
- configuring the token buckets to allocate bandwidth, in conjunction with the scheduler, in accordance with the strict priority and the weighted deficit round robin for excess bandwidth allocation.

16. The method as recited in claim 14, further comprising:
- configuring the token buckets for each client and each virtual port that have exceeded their respective predefined threshold based on their respective new bandwidth allocations and the strict priority/weighted deficit round robin.

17. The method as recited in claim 14, wherein configuring the token buckets for each virtual port further comprises:
- configuring a minimum token bucket;
- configuring a maximum token bucket;
- configuring the token buckets to allocate bandwidth, in conjunction with a scheduler, in accordance with the strict priority and round robin for minimum bandwidth allocation; and
- configuring the token buckets to allocate bandwidth, in conjunction with the scheduler, in accordance with the strict priority and the weighted deficit round robin for excess bandwidth allocation.

18. The method as recited in claim 14, further comprising:
- classifying every client, such that that respective data for each client is queued into a minimum group, when a minimum bandwidth is satisfied, a maximum group, when a maximum bandwidth is satisfied, and an excess group or idle group.

19. The method as recited in claim 14, further comprising for a client of the one or more clients:
- continuing servicing the client until a minimum bandwidth for the client is satisfied.

20. The method as recited in claim 14, further comprising accepting, in at least one of the token buckets, a number of tokens in proportion to a size of a packet being added to an associated client.

21. The method as recited in claim 14, further comprising:
- using, by at least one of the token buckets, its respective predefined bandwidth to determine how many tokens to release at predetermined time intervals.

22. The method as recited in claim 14, further comprising:
- comparing a fill rate of at least one of the clients or virtual ports with its respective predefined threshold to determine whether any of the clients or virtual ports have exceeded their respective predefined threshold.

23. The method as recited in claim 14, further comprising:
- processing data associated with at least one of the clients or virtual ports in accordance with a relative weight field, wherein the relative weight field is used to determine if the respective predefined bandwidth for the at least one of the clients or virtual ports is a relative bandwidth guarantee or an absolute bandwidth guarantee.

24. The method as recited in claim 14, wherein latency sensitive traffic in the network device is processed prior to processing latency insensitive traffic on a traffic burst basis.

25. A network device for scheduling packets, the network device comprising:
- one or more virtual port means implemented across multiple physical ports;
- one or more client means implemented across the one or more virtual port means, wherein each of the one or more client means supports a number of classes-of-service (COSs);
- one or more token bucket means, each token bucket means being associated with one of the one or more client means and the one or more virtual port means;
- maximum rate shaper means and minimum rate meter means for setting a shaping and metering behavior, so as to determine whether any of the clients or virtual ports have exceeded a respective predefined threshold;
- scheduling means for scheduling services of the clients and calculating a respective, new bandwidth allocation for each one of the one or more client means and each one of the one or more virtual port means that have exceeded their respective predefined threshold, each respective, new bandwidth allocation replacing a corresponding respective predefined bandwidth and being proportional to the corresponding respective predefined bandwidth for each of the clients and virtual ports that have exceeded their respective predefined threshold; and
- a first maximum rate shaper means and a minimum rate meter means for setting a shaping and metering behavior between each of the one or more clients and a scheduler to assure that each of the one or more clients has a minimum bandwidth allocated to it; and
- a second maximum rate shaper means coupled between the scheduler and the virtual port associated with the one or more clients.

* * * * *